United States Patent [19]

Pekar

[11] Patent Number: 5,022,109
[45] Date of Patent: Jun. 11, 1991

[54] INFLATABLE BLADDER

[75] Inventor: Robert W. Pekar, Florence, Mass.

[73] Assignee: Dielectrics Industries, Chicopee, Mass.

[21] Appl. No.: 535,655

[22] Filed: Jun. 11, 1990

[51] Int. Cl.⁵ .............................................. A47C 27/08
[52] U.S. Cl. ......................................... 5/449; 5/456; 5/457
[58] Field of Search ............. 5/441, 449, 453, 455–458

[56] References Cited

U.S. PATENT DOCUMENTS

| | | | |
|---|---|---|---|
| 1,625,810 | 4/1927 | Krichbaum | 5/458 X |
| 1,916,483 | 7/1933 | Krichbaum | 5/457 |
| 2,703,770 | 3/1955 | Melzer | 5/458 |
| 2,748,401 | 6/1956 | Winstead | 5/457 |
| 3,030,640 | 4/1962 | Gusman | 5/455 |
| 4,483,030 | 11/1984 | Flick et al. | 5/455 X |
| 4,891,855 | 1/1990 | Cheng-Chung | 5/458 |

Primary Examiner—Michael F. Trettel
Attorney, Agent, or Firm—Chapin, Neal & Dempsey

[57] ABSTRACT

An inflatable bladder is defined by two superimposed outer sheets of heat-sealable synthetic plastic fused together about their peripheral edges. An Intermediate layer or baffle is disposed between the two outer sheets and is alternately sealed to one and the other of the outer sheets to form air cells on the opposite sides of the intermediate layer. Each of the air cells is defined by an opposed surfaces on one side of the intermediate layer and of one of the outer sheets and adjacent seals which fuse together the layer and each sheet. The seals which define the cells on one outer surface of the bladder are offset from the seals which define the cells on the other surface of the bladder. Opposite surface portions of the intermediate layer are coated with a barrier layer to prevent heat-sealing on each side of the intermediate layer opposite the seals on the other side which form the cells whereby the bladder and the cells thereof may all be formed simultaneously in one heat-sealing operation.

8 Claims, 1 Drawing Sheet

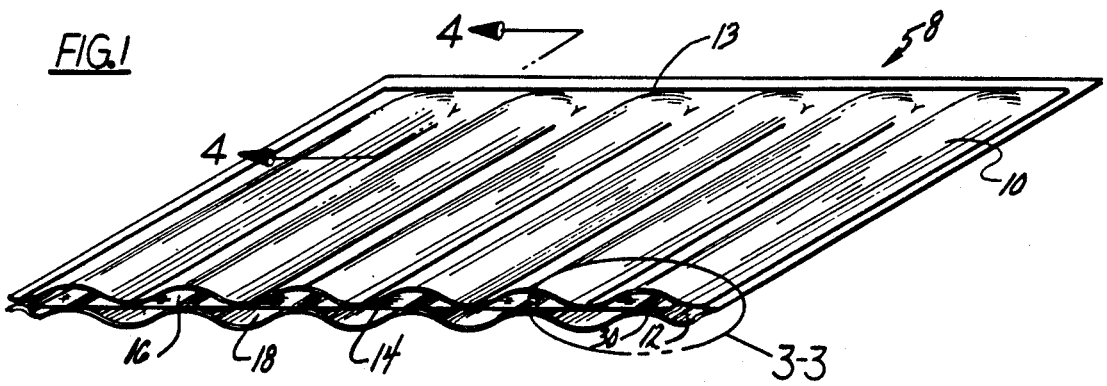
FIG. 1
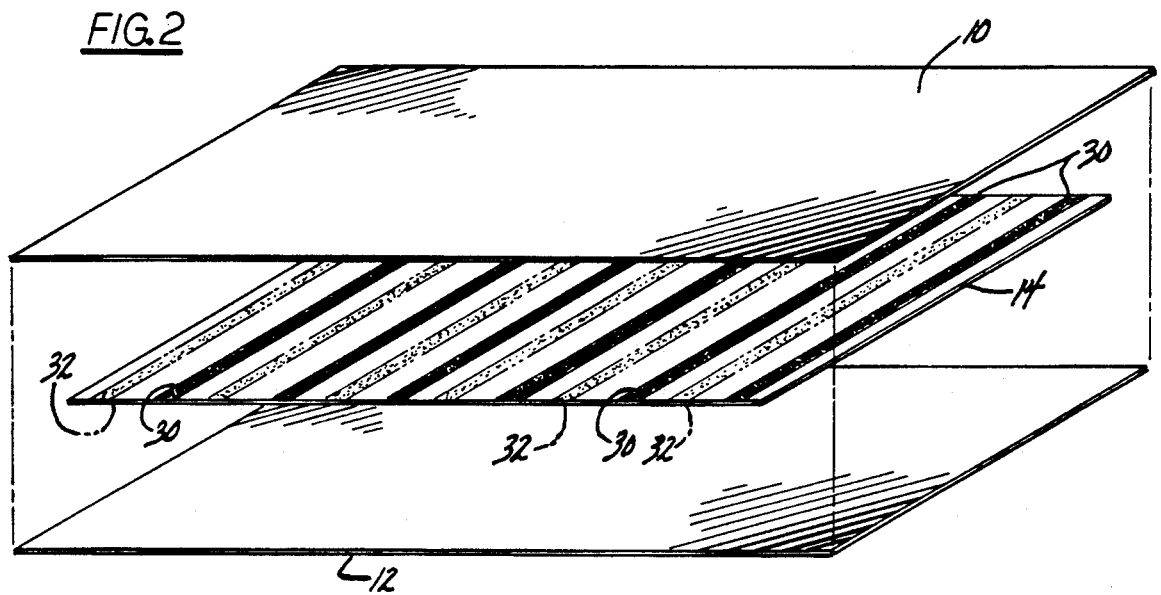
FIG. 2
FIG. 4
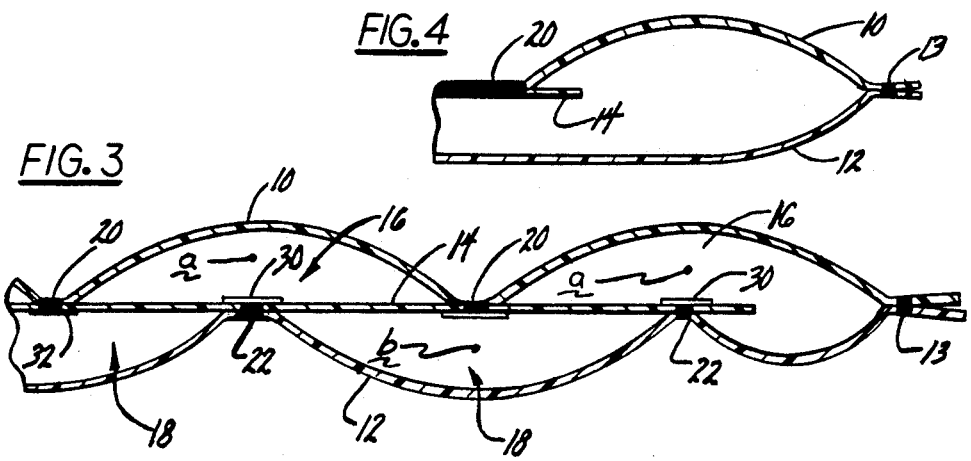
FIG. 3

INFLATABLE BLADDER

BACKGROUND OF THE INVENTION

This invention relates to inflatable air bladders, such as mattresses and the like, composed of three layers fused together to form plurality of air cells on opposite surfaces of the bladder. More particularly, the invention relates to an inflatable air bladder in which the middle layer is coated on opposite sides with barrier material which inhibits heat-sealing of one outer layer onto one side of the middle layer at the same sites that the middle layer is sealed to the other outer layer.

Air mattresses consisting of individual air cells formed by sealing together two or three layers of heat-sealable polymeric material are known in the prior art. In this connection, for example, U.S. Pat. No. 2,691,179 to Kann discloses an air mattress comprising a pneumatic structure for a mattress formed by sealing together two sheets of heat-sealable material. To overcome sagging of the mattress, known as the "hammock" effect, the cells are superimposed in two layers, with the cells in one layer disposed transversely to the cells in the other layer.

U.S. Pat. No. 2,731,652 to Bishop also discloses an air mattress formed by heat-sealing together two sheets of heat-sealable material.

U.S. Pat. No. 4,483,030 to Flick, et al, discloses an air pad formed by heat-sealing two sheets of heat-sealable material to a middle layer in a selective rectangular pattern. During the fabrication of the air pad, a sealing barrier mechanism 54 is used having a plurality of parallel fingers 58 so that the middle layer will not be heat-sealed to both the outer sheets at corresponding points.

U.S. Pat. No. 4,488,929 to Ostertag also discloses the use of a barrier apparatus for fabricating air mattresses composed of two outer sheets and center layer whereby the center layer will not be fused to both outer sheets at corresponding fusion points. In this patent, laterally-spaced, comb-like elements 5' and 6' are fitted between the opposite surface of the center layer and the two outer sheets whereby the center layer is alternately sealed to the outer sheets along laterally-spaced seal lines.

It is the principal object of this invention to provide a multi-layer, inflatable air bladder construction in which the middle layer thereof is treated with a barrier material so that it will be adapted to be heat-sealed to both outer sheets of the bladder in a predetermined air cell pattern, but without corresponding points of the middle layer being sealed to both outer sheets.

It is another object of this invention to provide an improved method of fabricating an inflatable air bladder which is simpler and more economical than methods heretofore available for the same purpose.

The above and other objects and advantages of this invention will be more readily apparent from the following description read in conjunction with the accompanying drawings in which:

FIG. 1 is a perspective view, partially in section, of an inflatable bladder of the type embodying this invention;

FIG. 2 is an exploded view of FIG. 1;

FIG. 3 is a section on an enlarged scale taken along line 3—3 of FIG. 1, and

FIG. 4 is a section on an enlarged scale taken along line 4—4 of FIG. 1.

In FIG. 1 is shown an inflatable bladder to be used for any type of cushioning purposes, such as shoe inserts or air mattresses typically used in hospitals and nursing homes for bed ridden patients to reduce the incidence of bed sores resulting from uneven pressure of the mattress on the patient's body. The mattress, shown generally at 8, comprises upper and lower synthetic plastic sheets 10 and 12 sealed together around the peripheral edges, as at 13, and another plastic sheet or layer 14 adapted to be disposed between the outer two sheets. The middle, central or intermediate layer serves as a "baffle" to confine the air within a plurality of cells 16 and 18 which form a dimpled or corrugated outer surface on opposite sides of the mattress. The longer dimension of the air cells may, for different applications, either run laterally from side-to-side or longitudinally from head-to-foot of the mattress. In accordance with this invention, the two outer sheets 10 and 12 and intermediate layer 14 are preferably united by using a radio-frequency (R.F.) sealing technique, but may also be fused by other well known sealing methods, hereinafter generally called "heat-sealing." In general, thermal or electromagnetic energy is applied to the areas of thermoplastic sheets in contact with one and other. The energy will cause softening and fusion at the zones of contact to effect a weld when the plastic solidifies. The three sheets are of the same air impermeable material, such as a polyvinyl chloride or polyurethane polymers commonly used in such inflatable pads.

Each cell 16 (FIG. 3) is defined by a portion of the top sheet 10, opposed portions of the baffle 14 and adjacent seal lines 20. Similarly, each cell 18 is defined by portions of the sheet 12, opposed portions of the baffle 14 and adjacent seals 22. It will be noted that the air cells 16 form the upper dimpled surface of the mattress 8, while cells 18 form the lower dimpled surface of the mattress. Each cell, when inflated, has a geometric center line a which, in a vertical plane, corresponds approximately to the location of the seal lines 22 while center line b of cells 18 vertically corresponds with the location of seal lines 20. This construction minimizes the "hammock" effect since each of the seal lines 20 and 22 is, in effect, supported or cushioned by the volume of air confined in opposing air cells 16 and 18.

The intermediate layer, or baffle 14, the same material as the outer sheets 10 and 12 comprises a heat-sealable plastic sheet, smaller in length and width than the outer sheets. This relationship ensures that the peripheral edges of baffle 14 will not be captured by the peripheral seal 13 joining the outer sheets 10 and 12. As best illustrated in FIG. 4, the cells 16 and 18 are each "open" at their outer ends within the mattress to provide for communication of air located on each side of baffle 14. The baffle 14 is coated on opposite surfaces by a barrier film or layer in a predetermined pattern which inhibits or prevents heat or R.F. sealing of the coated areas of the baffle layer 14 to the outer sheets 10 and 12, even though those areas may be abutted and subjected to sufficient energy to otherwise fuse the layers together.

In the illustrative embodiment, the upper surface of the barrier layer is coated in a pattern of laterally-spaced, parallel ribbons or bands 30. The lower surface is similarly coated with barrier ribbons or bands 32. The bands may either be continuous in length or composed of longitudinally spaced segments, depending upon the sealing pattern desired. In addition, the width of each of the bands 30 and 32 is sufficient to ensure that the sealing will not occur at the coated locations and, in the illustrated embodiment, the bands may be on the order of ¼"–1" in width.

The barrier coatings 30 and 32 may be applied by conventional printing techniques, such as silk screening, rotogravure or flexographic process. Preferably, the coatings are applied as a composition in a liquid dispersion medium of an organic solvent or water base with a dispersed phase of finely divided microscopic particles of a polyethylene, a polytetrafluoroethylene (Teflon) or silicone on the order of five (5) microns in diameter. The dispersed phase may constitute about 20% by volume of the composition. The organic vehicle may be of the type used for printing ink, such as an acrylic-butyrate lacquer. In any case, it is essential that the dispersion medium selected be one which will condition the surface of the vinyl baffle so that the microscopic particles will adhere, or be anchored to the surface of the baffle 14. Preferably, the barrier coating is applied to a continuous web of baffle material of pretermined width. The baffle may be coated first on one side, then on the other side with evaporation of the liquid phase occurring between coating steps. Alternatively, both sides may be simultaneously coated with a higher viscosity and faster drying suspension. With the particulate matter firmly bonded to the surface of the vinyl baffle material, the polyethylene, Teflon or silicone particles will serve as a "barrier", or "release" material which will inhibit sealing of the coated areas to the abutted areas of the upper or lower vinyl sheets.

As best seen in FIG. 3, the coated bands 30 on one side of the baffle 14 are disposed midway between the bands 32, coated on the opposite side of the baffle layer 14. The space between adjacent bands 30 and 32 of the coating material is sufficient to provide for the formation of air cells 16 and 18 of cross-sectional area to ensure that the mattress 8 will have good body supporting characteristics since other than the peripheral seal 13, no seal extends through the bladder.

Having thus described my invention, what is claimed is:

1. Inflatable bladder comprising superimposed upper and lower, outer sheets of heat-sealable synthetic plastic material sealed together about their peripheral edge portions, an intermediate layer, also of heat-sealable material, interposed between the upper and lower sheets and sealed thereto at spaced locations on opposite surfaces thereof to form a plurality of air cells disposed on opposite sides of the intermediate layer and forming the outer surfaces of said bladder, said intermediate layer having coating of a barrier material at pretermined sites on the surfaces thereof, said sites being located opposite the spaced locations at which the intermediate layer is sealed to the outer sheets, said barrier material comprising a composition which is bonded to the intermediate layer and inhibits heat-sealing of said intermediate layer at the coated sites such that said cells may be formed by simultaneously heat-sealing together the intermediate layer and said upper and lower sheets at said spaced locations, but not at the coated sites.

2. Inflatable bladder, as set forth in claim 1, in which the sealed locations are laterally-spaced, parallel strips and in which said coated sites are in the form of bands disposed in parallel, laterally-spaced relation between adjacent sealed strips on opposite surfaces of said intermediate layer.

3. Inflatable bladder, as set forth in claim 2, in which adjacent sealed locations on one side of the intermediate layer are approximately midway between adjacent strips on the opposite sides thereof.

4. Inflatable bladder, as set forth in claim 2, in which the sealed locations and said site bands are continuous in length.

5. Inflatable bladder, as set forth in claim 2, in which the sealed locations and site bands of barrier material are discontinuous in length.

6. Inflatable bladder, as set forth in claim 1, in which said composition comprises a finely-divided, micron size particulate matter which inhibits heat-sealing together the outer sheets and the intermediate layer at said sites.

7. Inflatable bladder, as set forth in claim 6, in which the particulate matter comprises a thermoplastic resin selected from the group consisting of polytetrafluoroethylene, polyethylene and silicone.

8. Inflatable bladder, as set forth in claim 6, in which said outer sheets and intermediate layer are polyvinylchloride sheet material and said particulate matter is the dispersed phase of a dispersion used to apply the barrier material coating at said sites, the dispersion having a liquid dispersion medium adapted to condition the intermediate layer to cause said particulate matter to bond to the surface thereof.

* * * * *